(12) United States Patent
Chen et al.

(10) Patent No.: US 8,758,478 B2
(45) Date of Patent: *Jun. 24, 2014

(54) METHOD FOR CYCLICALLY PREPARING TITANIUM SPONGE AND COPRODUCING SODIUM CRYOLITE USING SODIUM FLUOTITANATE AS INTERMEDIATE MATERIAL

(71) Applicant: Shenzhen Sunxing Light Alloys Materials Co., Ltd, Shenzhen (CN)

(72) Inventors: Xuemin Chen, Guangdong (CN); Yueming Yu, Guangdong (CN); Qingdong Ye, Guangdong (CN); Jun Yang, Guangdong (CN); Zhi Zhou, Guangdong (CN); Xinyi Chen, Guangdong (CN)

(73) Assignee: Shenzhen Sunxing Light Alloys Materials Co., Ltd., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,949

(22) Filed: Dec. 8, 2012

(65) Prior Publication Data

US 2013/0098206 A1 Apr. 25, 2013

(30) Foreign Application Priority Data

Feb. 22, 2012 (CN) .......................... 2012 1 0040658

(51) Int. Cl.
*C22B 34/12* (2006.01)
*C01D 3/02* (2006.01)

(52) U.S. Cl.
USPC .............................................. 75/415; 75/392

(58) Field of Classification Search
USPC ............................................................. 75/415
See application file for complete search history.

(56) References Cited

U.S. PATENT DOCUMENTS

| | | | | |
|---|---|---|---|---|
| 2,785,971 | A | * | 3/1957 | Kamlet ........................... 75/419 |
| 4,466,950 | A | * | 8/1984 | Mein .............................. 423/599 |
| 2010/0173170 | A1 | * | 7/2010 | Pretorius ...................... 428/570 |

OTHER PUBLICATIONS http://www.geochemtec.eu/Tutorials/iron%20oxide%20hydroxide.html. 2009-2013.*

* cited by examiner

*Primary Examiner* — Roy King
*Assistant Examiner* — Xiaowei Su
(74) *Attorney, Agent, or Firm* — Jackson IPG PLLC

(57) ABSTRACT

A method for cyclically preparing titanium sponge and coproducing sodium cryolite using sodium fluotitanate as an intermediate material, which includes the following steps: A) adding hydrofluoric acid to titaniferous iron concentrate to enable a reaction to form fluotitanic acid; B) adding sodium carbonate and sodium hydroxide to the fluotitanic acid to enable a reaction to form the sodium fluotitanate; C) putting the sodium fluotitanate into a reactor, adding aluminum to react with the sodium fluotitanate to form the titanium sponge and sodium cryolite; D) extracting the sodium cryolite and sending it to a rotary reaction kettle together with concentrated sulphuric acid to enable a reaction to form hydrogen fluoride gas and sodium sulphate, aluminum sodium sulphate; collecting the hydrogen fluoride gas and dissolving it into water to obtain a hydrofluoric acid solution; E) recycling the obtained hydrofluoric acid to Step A to leach the titaniferous iron concentrate.

2 Claims, 3 Drawing Sheets

METHOD FOR CYCLICALLY PREPARING TITANIUM SPONGE AND COPRODUCING SODIUM CRYOLITE USING SODIUM FLUOTITANATE AS INTERMEDIATE MATERIAL

TECHNICAL FIELD OF THE INVENTION

The disclosure relates to a method for preparing titanium sponge, and in particular to a method for cyclically preparing titanium sponge and coproducing sodium cryolite using sodium fluotitanate as intermediate material.

BACKGROUND OF THE INVENTION

Titaniferous iron concentrate is the main mineral raw material for extracting titanium. The existing titanium sponge preparation method takes the titaniferous iron concentrate as an initial material, obtains a rich-titanium material through a reducing smelting process, a chlorinated melting process, a pre-reduction hydrochloric acid leaching process or a pre-reduction sulphuric acid leaching process, takes titanium tetrachloride which is formed by reacting the rich-titanium material with coke and chlorine gas at a high temperature of about 1000 DEG C. as an intermediate material, and then prepares the titanium sponge through a magnesium thermic reduction process (Kroll process) or a sodium thermic reduction process (Hunter process), wherein the reducing smelting process needs a high temperature of between 1700 and 1800 DEG C. and obtains the rich-titanium material after using coke to perform reduction; the chlorinated melting process needs a high temperature of about 1000 DEG C. and obtains the rich-titanium material after using coke and chlorine gas to perform reaction; the pre-reduction hydrochloric acid leaching process needs to be carried out at a high temperature of about 1200 DEG C., and uses hydrochloric acid to perform leaching after using coke to carry out pre-reduction, and then heats and dehydrates the titanic acid formed to obtain the rich-titanium material; the pre-reduction sulphuric acid leaching process needs to be carried out at a high temperature of about 1200 DEG C., and uses sulphuric acid to perform leaching after using coke to carry out pre-reduction, and then heats and dehydrates the titanic acid formed to obtain the rich-titanium material. The titanium tetrachloride will generate corresponding coproduct chlorate while preparing titanium sponge through the magnesium thermic reduction process (Kroll process) or the sodium thermic reduction process (Hunter process), and it is necessary to adopt a melting electrolytic method to separate and recycle the metal and chlorine gas.

Therefore, the conventional art for preparing titanium sponge using titanium tetrachloride as an intermediate material has disadvantages such as complex processes, demanding reaction conditions, high equipment investment requirements, relatively long production cycle, high production cost and non-environment friendly use of chlorine gas.

SUMMARY OF THE INVENTION

In order to solve the problem existing in the conventional art, the inventor has done a great deal of research in the selection of intermediate material and the circular process of coproduct and unexpectedly finds that the method for producing titanium sponge using sodium fluotitanate as an intermediate material has a simple process, recycles the coproduct, lowers the production cost and reduces the pollution to environment.

The disclosure provides a method for cyclically preparing titanium sponge and coproducing sodium cryolite using sodium fluotitanate as an intermediate material, which includes the following steps:

A) adding hydrofluoric acid to titaniferous iron concentrate to enable a reaction at a temperature of between 100 and 200 DEG C. to form fluotitanic acid, wherein the main reaction formula involved is: $6HF+TiO_2=H_2TiF_6+2H_2O$.

B) adding a mixed saline solution of sodium carbonate and sodium hydroxide to the fluotitanic acid, controlling PH=3-4, separating ferrous hydroxide from ferric hydroxide, further adding the mixed saline solution to make PH=7-8, obtaining a sodium fluotitanate solution, concentrating, crystallizing and rinsing the sodium fluotitanate solution to obtain the intermediate material sodium fluotitanate, wherein the main reaction formula involved is:

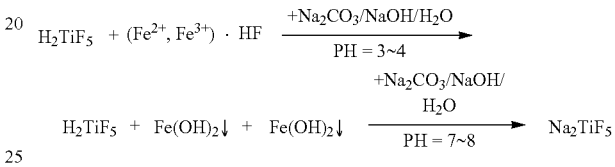

C) putting dried sodium fluotitanate into a reactor, injecting an inert gas to the reactor after vacuumizing, heating the reactor to a temperature of between 780 and 1000 DEG C., adding aluminium in the reactor and stirring quickly to enable a reaction for 4 to 6 hours to form the titanium sponge and sodium cryolite; or, putting the aluminium into the reactor, injecting an inert gas to the reactor after vacuumizing, heating the reactor to the temperature of between 780 and 1000 DEG C., adding dried sodium fluotitanate in the reactor and stirring quickly to enable a reaction for 4 to 6 hours to form the titanium sponge and sodium cryolite; after being kept stand, the supernatant liquid is sodium cryolite and the lower layer of titanium sponge can be removed of surface residual through acid leaching or distillation, wherein the main reaction formula involved is:

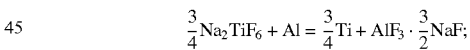

D) extracting molten liquid sodium cryolite; after the molten liquid sodium cryolite is cooled, crushing and sending it to a rotary reaction kettle quantificationally together with concentrated sulphuric acid to enable a reaction at a temperature of between 400 and 500 DEG C. to form hydrogen fluoride gas and the solid mixture of sodium sulphate and aluminium sodium sulphate; collecting the hydrogen fluoride gas and dissolving it into water to obtain a hydrofluoric acid aqueous solution; reacting the solid mixture of sodium sulphate and aluminium sodium sulphate with an aqueous solution of sodium hydroxide after crushing the solid mixture of sodium sulphate and aluminium sodium sulphate, and obtaining an aqueous solution of sodium sulphate after separating out the solid aluminium hydroxide, wherein the main reaction formula involved is:

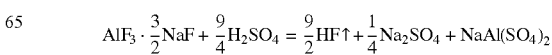

-continued $$Na_2SO_4 + NaAl(SO_4)_2 + 3NaOH = 3Na_2SO_4 + Al(OH)_3\downarrow;$$

E) recycling the obtained hydrofluoric acid aqueous solution to the front end to leach the titaniferous iron concentrate, so as to achieve the purpose of cyclically preparing the intermediate material sodium fluotitanate.

With the technical scheme above, sodium fluotitanate is used to replace titanium tetrachloride as the intermediate material for preparing titanium sponge, thus, the process is simple, the reaction condition is relatively mild, the production flow is short, the obtained coproduct sodium cryolite can realize the cyclic regeneration of sodium fluotitanate only needing common chemical materials such as industrial concentrated sulphuric acid and sodium hydroxide, it is not necessary to use chlorine gas and perform melting electrolysis, the production cost is lowered and the pollution to environment is reduced.

The technical scheme adopted above overcomes the disadvantages in the conventional such as complex processes, high equipment investment requirements, high production cost, relatively long production cycle and being easy to result in environmental pollution.

As a further improvement of the disclosure, in Step C, the aluminium is molten aluminium which is added in the reactor in a dripping way, or the aluminium is added in the reactor first and then dried sodium fluotitanate is batch-fed in the reactor after the aluminium is molten, wherein the completeness of this reaction can be greater than or equal to 95%.

As a further improvement of the disclosure, in Step C, the inert gas is argon.

Compared with the conventional art, the disclosure achieves advantages as follows: using sodium fluotitanate as an intermediate material, the preparation method has a simple process and a short production cycle, and improves production efficiency; the coproduct is sodium cryolite, which has a high commercial value and a good application prospect and can be used as a source of the intermediate material sodium fluotitanate; thus, fully cyclic regeneration of resource is realized, melting electrolysis is avoided, the comprehensive cost of production of titanium sponge is lowered and the pollution to environment is reduced.

DETAILED DESCRIPTION OF THE EMBODIMENTS

Figure 1:
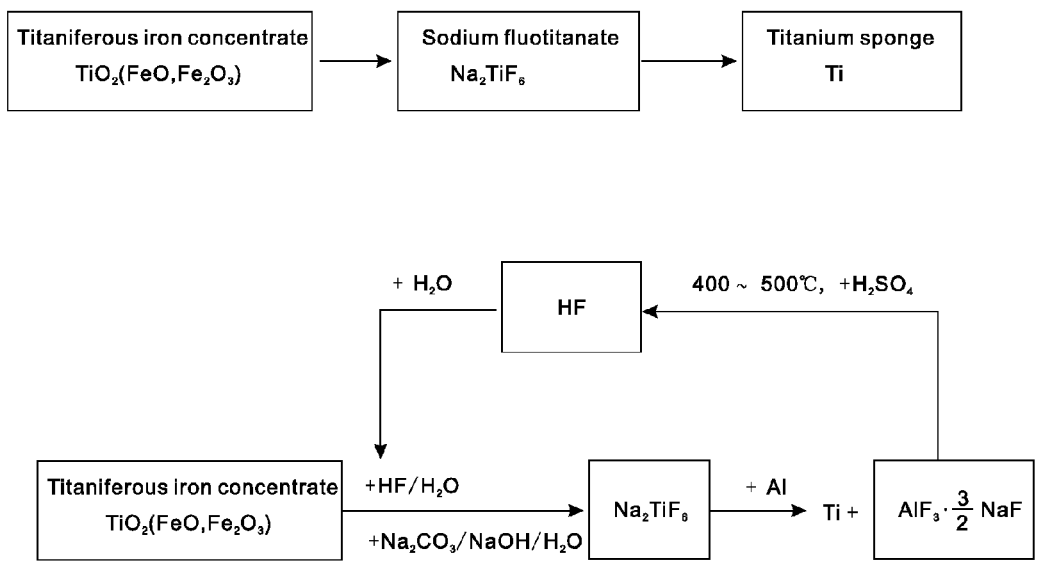
FIG. 1 shows a process route chart of preparing titanium sponge according to the disclosure.
Figure 2:
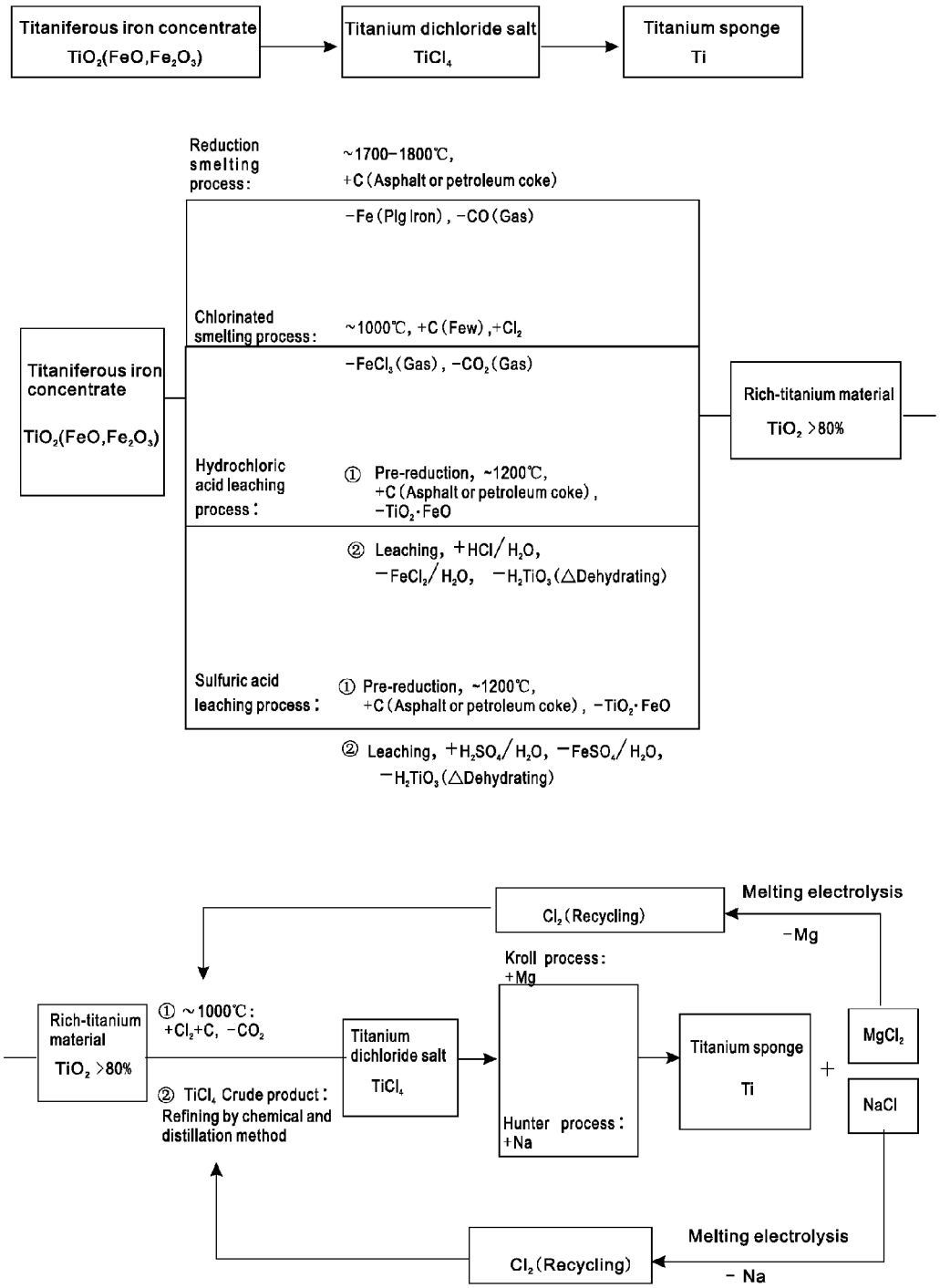
FIG. 2 shows an existing popular process route chart of preparing titanium sponge.
Figure 3:
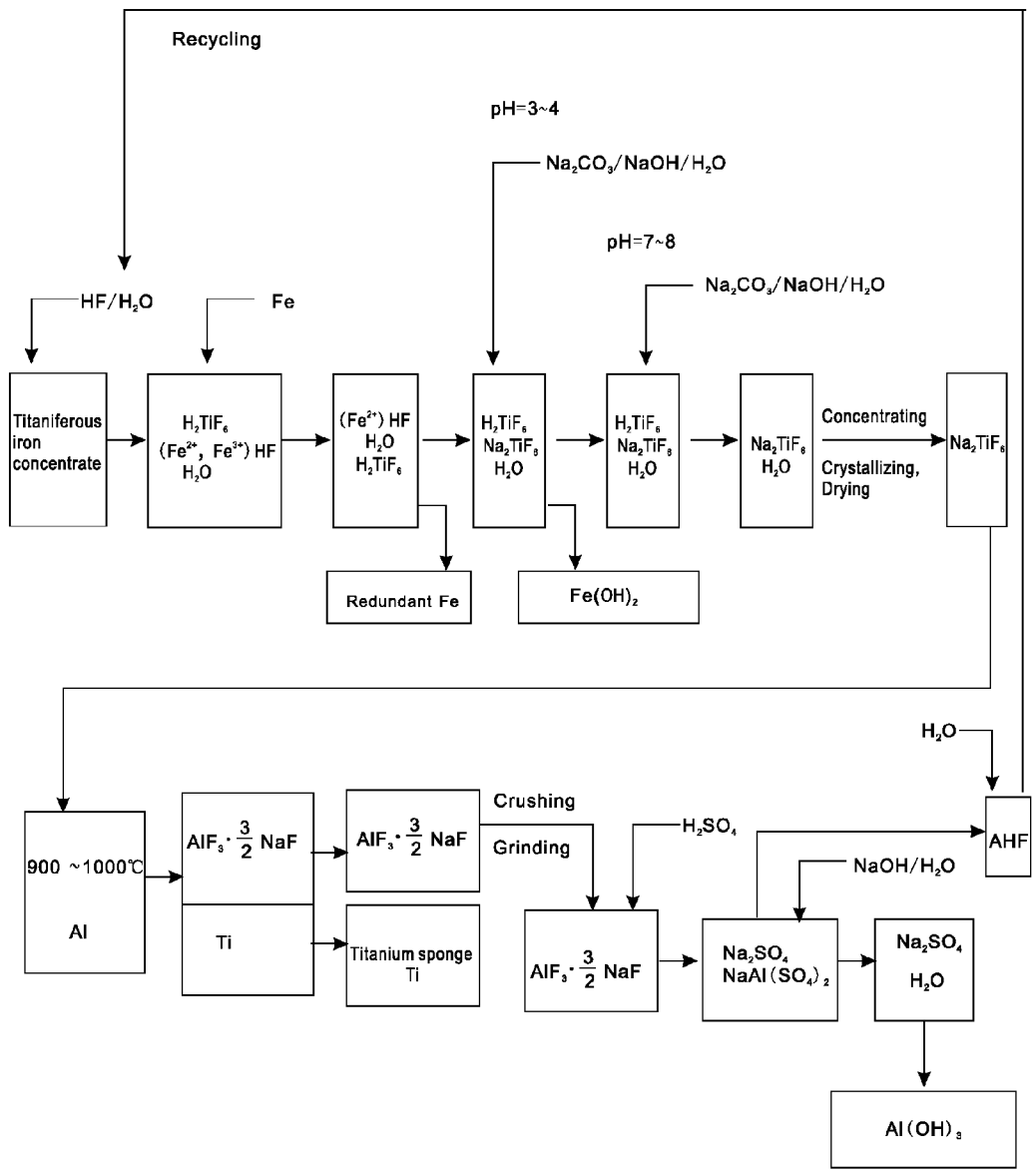
FIG. 3 shows a process flowchart of preparing titanium sponge according to the disclosure.

The disclosure is described below in further detail through specific embodiments.

Embodiment 1

Putting 1 ton of titaniferous iron concentrate powder into a reaction kettle; adding 4.5 tons of 10% (volume percent) hydrofluoric acid in the reaction kettle to fully react with the titaniferous iron concentrate powder at a temperature of 120 DEG C to form fluotitanic acid; after the fluotitanic acid is cooled, adding 5 tons of 10% (mass percent) mixed saline solution of sodium carbonate and sodium hydroxide to the fluotitanic acid, controlling PH=3-4, separating ferrous hydroxide from ferric hydroxide, further adding 2 tons of mixed saline solution to make PH=7-8, obtaining a sodium fluotitanate solution; concentrating, crystallizing and rinsing the sodium fluotitanate solution to obtain the intermediate material sodium fluotitanate; drying and then weighing the sodium fluotitanate; putting the sodium fluotitanate into another reactor; injecting argon to the reactor for protection after vacuumizing, heating the reactor to a temperature of between 800 and 1000 DEG C; dripping molten aluminium into the reactor slowly in accordance with a reaction ratio, stirring quickly and enabling a reaction for 5 hours to form titanium sponge and sodium cryolite; opening the cover of the reactor, pumping the superstratum sodium cryolite through a siphon-pump and distilling the lower layer of titanium sponge at a temperature of 1000 DEG C under vacuum to obtain purified titanium sponge; crushing and weighing the sodium cryolite after it is cooled, and adding concentrated sulphuric acid to the sodium cryolite in accordance with a reaction ratio to enable a full reaction at a temperature of between 400 and 500 DEG C; condensing and collecting the formed hydrogen fluoride gas and dissolving it into water to obtain hydrofluoric acid.

Embodiment 2

Putting 1 ton of titaniferous iron concentrate powder into a reaction kettle; adding 4.5 tons of 10% (volume percent) hydrofluoric acid in the reaction kettle to fully react with the titaniferous iron concentrate powder at a temperature of 120 DEG C to form fluotitanic acid; after the fluotitanic acid is cooled, adding 5 tons of 10% (mass percent) mixed saline solution of sodium carbonate and sodium hydroxide to the fluotitanic acid, controlling PH=3-4, separating ferrous hydroxide from ferric hydroxide, further adding 2 tons of mixed saline solution to make PH=7-8, obtaining a sodium fluotitanate solution; concentrating, crystallizing and rinsing the sodium fluotitanate solution to obtain the intermediate material sodium fluotitanate; drying and then weighing the sodium fluotitanate; putting the sodium fluotitanate into another reactor; injecting argon to the reactor for protection after vacuumizing, heating the reactor to a temperature of 800 DEG C; adding dried sodium fluotitanate in the reactor, stirring quickly and enabling a reaction for 5 hours to form titanium sponge and sodium cryolite; opening the cover of the reactor, pumping the superstratum sodium cryolite through a siphon-pump and distilling the lower layer of titanium sponge at a temperature of 1000 DEG C under vacuum to obtain purified titanium sponge; crushing and weighing the sodium cryolite after it is cooled, and adding concentrated sulphuric acid to the sodium cryolite in accordance with a reaction ratio to enable a full reaction at a temperature of between 400 and 500 DEG C; condensing and collecting the formed hydrogen fluoride gas and dissolving it into water to obtain hydrofluoric acid. Dissolving resultants of the reaction of the sodium cryolite and the concentrated sulphuric acid into water after crushing the resultants, and adding a calculated mount of 10% (mass percent) sodium hydroxide aqueous solution; performing filtering to remove aluminium hydroxide and obtain an aqueous solution of sodium sulphate.

The above are the further detailed description of the disclosure made in conjunction with specific preferred embodiments; it can not be considered that the specific embodiment of the disclosure is only limited to the description above. For the common technicians in the technical field of the disclosure, umpty simple deductions or substitutes can be made

What is claimed is:

1. A method for cyclically preparing titanium sponge and coproducing sodium cryolite using sodium fluotitanate as an intermediate material, which includes the following steps:

A) adding hydrofluoric acid to titaniferous iron concentrate to initiate a reaction in a first reactor at a temperature of between 100 and 200 DEG C to form fluotitanic acid;

B) adding a mixed saline solution of sodium carbonate and sodium hydroxide to the fluotitanic acid, controlling PH=3-4, separating ferrous hydroxide from ferric hydroxide, further adding the mixed saline solution to make PH=7-8, obtaining a sodium fluotitanate solution, concentrating, crystallizing and rinsing the sodium fluotitanate solution to obtain the intermediate material sodium fluotitanate;

C) putting dried sodium fluotitanate into a second reactor, injecting an inert gas to the second reactor after vacuumizing, heating the second reactor to a temperature of between 780 and 1000 DEG C, dripping molten aluminium in the second reactor and stirring quickly to initiate a reaction for 4 to 6 hours to form titanium sponge and sodium cryolite; or, putting aluminium into a second reactor, injecting an inert gas to the second reactor after vacuumizing, heating the second reactor to the temperature of between 780 and 1000 DEG C, adding dried sodium fluotitanate in the second reactor after the aluminium is molten and stirring quickly to initiate a reaction for 4 to 6 hours to form titanium sponge and sodium cryolite;

D) extracting molten liquid sodium cryolite; after the molten liquid sodium cryolite is cooled, crushing and sending it to a rotary reaction kettle quantificationally together with concentrated sulphuric acid to initiate a reaction at a temperature of between 400 and 500 DEG C to form hydrogen fluoride gas and a solid mixture of sodium sulphate and aluminium sodium sulphate; collecting the hydrogen fluoride gas and dissolving it into water to obtain a hydrofluoric acid aqueous solution; reacting the solid mixture of sodium sulphate and aluminium sodium sulphate with an aqueous solution of sodium hydroxide after crushing the solid mixture of sodium sulphate and aluminium sodium sulphate, and obtaining an aqueous solution of sodium sulphate after separating out solid aluminium hydroxide; and E) recycling the obtained hydrofluoric acid aqueous solution to step A) to leach the titaniferous iron concentrate, so as to cyclically prepare the intermediate material sodium fluotitanate.

2. The method for cyclically preparing titanium sponge and coproducing sodium cryolite using sodium fluotitanate as an intermediate material according to claim 1, wherein in Step C, the inert gas is argon.

* * * * *